United States Patent
Masuda et al.

(10) Patent No.: US 11,306,222 B2
(45) Date of Patent: Apr. 19, 2022

(54) FLUOROCARBON, LUBRICANT FOR USE ON ICE AND SNOW, AND COATING METHOD

(71) Applicant: DAIKIN INDUSTRIES, LTD., Osaka (JP)

(72) Inventors: Eiji Masuda, Osaka (JP); Kazuya Kawahara, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 0 days.

(21) Appl. No.: 17/051,338

(22) PCT Filed: Apr. 11, 2019

(86) PCT No.: PCT/JP2019/015784
§ 371 (c)(1),
(2) Date: Oct. 28, 2020

(87) PCT Pub. No.: WO2019/225194
PCT Pub. Date: Nov. 28, 2019

(65) Prior Publication Data
US 2021/0062046 A1    Mar. 4, 2021

(30) Foreign Application Priority Data

May 21, 2018  (JP) .............................. JP2018-097079

(51) Int. Cl.
*C09G 3/00*     (2006.01)
*C10M 101/02*   (2006.01)
*C10M 125/18*   (2006.01)
*C10N 50/10*    (2006.01)

(52) U.S. Cl.
CPC ........... *C09G 3/00* (2013.01); *C10M 101/025* (2013.01); *C10M 125/18* (2013.01); *C10M 2201/042* (2013.01); *C10M 2205/163* (2013.01); *C10N 2050/10* (2013.01)

(58) Field of Classification Search
CPC ... C09G 3/00; C10M 101/025; C10M 125/18; C10M 2201/042; C10M 2205/163; C10M 147/00; C10M 169/04; C10M 159/06; C10M 103/02; C10M 125/02; C10M 101/02; C10N 2050/10; C07C 19/10
See application file for complete search history.

(56) References Cited

U.S. PATENT DOCUMENTS

| | | | |
|---|---|---|---|
| 3,607,747 A | 9/1971 | Ishikawa et al. | |
| 5,131,674 A * | 7/1992 | Tokui | C09G 3/00 |
| | | | 280/600 |
| 6,028,136 A | 2/2000 | Gambaretto | |
| 2011/0098517 A1 | 4/2011 | Hamwi et al. | |

FOREIGN PATENT DOCUMENTS

| | | | | |
|---|---|---|---|---|
| JP | 5571796 A * | 5/1980 | ............. | C10M 9/00 |
| JP | 03-157494 A | 7/1991 | | |
| JP | 03-157497 A | 7/1991 | | |
| JP | 461712 A * | 2/1992 | | |
| JP | 10-067892 A | 3/1998 | | |
| JP | 2005-506408 A | 3/2005 | | |
| JP | 2005-213371 A | 8/2005 | | |
| JP | 2005213371 A * | 8/2005 | | |
| JP | 2011-522098 A | 7/2011 | | |
| WO | 03/033608 A1 | 4/2003 | | |
| WO | 2012/018403 A1 | 2/2012 | | |

OTHER PUBLICATIONS

International Preliminary Report on Patentability with translation of Written Opinion dated Nov. 24, 2020 from the International Bureau in International Application No. PCT/JP2019/015784.
International Search Report for PCT/JP2019/015784 dated Jun. 11, 2019 (PCT/ISA/210).
Extended European Search Report dated Feb. 18, 2022 issued by European Patent Office in counterpart EP Appln. No. 19807022.9.

* cited by examiner

*Primary Examiner* — Taiwo Oladapo
(74) *Attorney, Agent, or Firm* — Sughrue Mion, PLLC

(57) ABSTRACT

A laminate including a target, a coating film of a lubricant containing a paraffin wax and carbon fluoride formed on the target. The carbon fluoride is graphite fluoride having a proportion of 0.1 to 2.0% by mass relative to the paraffin wax. Further, an amount of the carbon fluoride in a vicinity of a target on which the coating film is formed is larger than an amount of the carbon fluoride on a surface opposite the target. Also disclosed is a method of coating a target as well as snow or ice sliding equipment.

4 Claims, No Drawings

FLUOROCARBON, LUBRICANT FOR USE ON ICE AND SNOW, AND COATING METHOD

CROSS REFERENCE TO RELATED APPLICATIONS

This application is a National Stage of International Application No. PCT/JP2019/015784 filed Apr. 11, 2019, claiming priority based on Japanese Patent Application No. 2018-097079 filed May 21, 2018.

TECHNICAL FIELD

The disclosure relates to carbon fluoride, lubricants for use on snow or ice, and coating methods.

BACKGROUND ART

Sliding equipment used in a sport of sliding on snow or ice, such as skiing, is required to have high slidability. Thus, studies have been made on lubricants to be applied to such sliding equipment.

Patent Literature 1 discloses a composition consisting essentially of from about 10 wt % to about 90 wt % of at least one paraffin wax and from about 10 wt % to about 90 wt % of at least one fluoropolymer micro powder.

Patent Literature 2 discloses a lubricant for skis, comprising 50 to 95% by weight of a paraffin wax and 5 to 50% by weight of a graphite fluoride.

CITATION LIST

Patent Literature

Patent Literature 1: JP 2005-506408 T
Patent Literature 2: JP H03-157494 A

SUMMARY OF INVENTION

Technical Problem

The disclosure aims to provide a lubricant that can enhance the slidability on snow or ice.

Solution to Problem

The disclosure relates to carbon fluoride used in a lubricant for use on snow or ice, the lubricant containing a paraffin wax, wherein the carbon fluoride is used in a proportion of 0.1 to 2.0% by mass relative to the paraffin wax.

Preferably, a mole ratio F/C of fluorine atoms to carbon atoms in the carbon fluoride is 1.00 or higher.

Preferably, the lubricant further contains a fluororesin.

Preferably, the lubricant is applied such that an amount of the carbon fluoride in a vicinity of a target on which a coating film of the lubricant is to be formed is larger than an amount of the carbon fluoride on a surface opposite the target.

Preferably, the lubricant is used for skiing or skating.

The disclosure also relates to a lubricant for use on snow or ice, containing a paraffin wax, and 0.1 to 2.0% by mass of carbon fluoride relative to the paraffin wax.

Preferably, a mole ratio F/C of fluorine atoms to carbon atoms in the carbon fluoride is 1.00 or higher.

Preferably, the lubricant further contains a fluororesin.

Preferably, the lubricant is applied such that an amount of the carbon fluoride in a vicinity of a target on which a coating film of the lubricant is to be formed is larger than an amount of the carbon fluoride on a surface opposite the target.

Preferably, the lubricant is used for skiing or skating.

The disclosure also relates to a method of coating a target including irregularities on a surface with a lubricant for use on snow or ice, the method including: (1) applying carbon fluoride to the surface including the irregularities of the target; (2) applying a paraffin wax to the surface to which the carbon fluoride has been applied; (3) smoothing a surface of a resulting coating film; and (4) exposing the irregularities by treatment on the smoothed surface of the coating film, wherein a proportion of the carbon fluoride is 0.1 to 2.0% by mass relative to the paraffin wax.

The disclosure also relates to a lubricant for use on snow or ice, consisting of carbon fluoride.

Preferably, a mole ratio F/C of fluorine atoms to carbon atoms in the carbon fluoride is 1.00 or higher.

Preferably, the lubricant is used for skiing or skating.

Advantageous Effects of Invention

The disclosure can provide a lubricant that can enhance the slidability on snow or ice.

DESCRIPTION OF EMBODIMENTS

Hereinafter, the disclosure is described in detail.

The disclosure relates to carbon fluoride used in a lubricant for use on snow or ice.

The lubricant for use on snow or ice in which the carbon fluoride of the disclosure is used contains a paraffin wax.

The carbon fluoride of the disclosure is used in a proportion of 0.1 to 2.0% by mass relative to the paraffin wax.

The lubricant for use on snow or ice in which the carbon fluoride of the disclosure is used contains the paraffin wax and 0.1 to 2.0% by mass of the carbon fluoride relative to the paraffin wax.

The disclosure also relates to a lubricant for use on snow or ice containing a paraffin wax and 0.1 to 2.0% by mass of carbon fluoride relative to the paraffin wax.

Hereinafter, the lubricant for use on snow or ice of the disclosure and the lubricant for use on snow or ice in which the carbon fluoride of the disclosure is used are collectively referred to as the first lubricant.

Use of such a limited proportion of carbon fluoride as described above relative to a paraffin wax can enhance the slidability on snow or ice. Also, the first lubricant has a high antifouling property which reduces the chances for dust on snow or ice to adhere to sliding equipment, leading to slidability that hardly decreases during sliding. Use of the carbon fluoride above also makes the slidability less susceptible to the snow quality, achieving stable slidability.

The proportion of the carbon fluoride to the paraffin wax is preferably 0.3% by mass or higher and 1.9% by mass or lower, more preferably 1.0% by mass or lower.

The carbon fluoride is also called graphite fluoride which mainly contains poly(carbon monofluoride) and is different from a compound obtained by replacing hydrogen atoms in a hydrocarbon compound by fluorine atoms and fluoropolymers such as a fluororesin.

The carbon fluoride is preferably one obtained by fluorinating a carbon material with fluorine gas.

Suitable as the carbon material is carbon black. The carbon black can be a commercially available one such as furnace black (e.g., Asahi #55 available from Asahi Carbon Co., Ltd.), channel black (e.g., Raven 7000 available from Columbia Carbon Company), thermal black (e.g., Seba Carbo MT-C1 available from Columbia Carbon Company), or acetylene black (e.g., Denka Black available from Denka Company Limited).

The carbon fluoride can be obtained by bringing a carbon material into contact with fluorine gas preferably at 200° C. to 600° C., more preferably at 300° C. to 500° C. Contact at lower than 200° C. causes problems such as slow fluorination reaction, an insufficient increase in the degree of fluorination, and insufficient thermal stability. Contact at higher than 600° C. tends to cause pyrolysis, leading to a low carbon fluoride yield. Also, such contact may cause an explosion due to a rapid pyrolytic reaction, and thus requires sufficient care.

The fluorine gas used in the reaction may be diluted with an inert gas such as nitrogen, argon, helium, or carbon tetrafluoride or may contain hydrogen fluoride.

The fluorination reaction can be conducted under ordinary pressure, reduced pressure, or increased pressure. The conditions such as fluorination reaction time and a fluorine gas flow rate can be adjusted as appropriate according to the reactivity between the raw material, i.e., carbon material, and fluorine and the desired mole ratio F/C of fluorine atoms to carbon atoms.

The carbon fluoride preferably has a mole ratio F/C of fluorine atoms to carbon atoms of 0.98 or higher, more preferably 1.00 or higher, still more preferably 1.01 or higher, particularly preferably 1.10 or higher. The F/C in the above range can further enhance the slidability on snow or ice. The upper limit of the F/C may be 1.3.

The F/C is calculated as follows.

Carbon fluoride, a combustion improver $Na_2O_2$, and a polyethylene film are burnt in an oxygen-filled flask, and the hydrogen fluoride generated is made to be absorbed by water. The amount of hydrogen fluoride generated is measured using a fluoride ion meter (Ion analyzer 901, Orion). The whole residue of the carbon fluoride is considered as carbon, and the ratio F/C of the number of fluorine atoms to the number of carbon atoms is calculated. This calculated value is regarded as the F/C of the carbon fluorine.

The carbon fluoride is preferably in the form of particles whose average particle size is preferably 0.01 to 50 μm, more preferably 0.01 to 20 μm. Carbon fluoride particles having an average particle size smaller than 0.01 μm have a strong tendency to undergo secondary aggregation, likely being difficult to disperse uniformly in a paraffin wax when used. Carbon fluoride particles having an average particle size larger than 50 μm tend to have poor dispersibility.

The average particle size is measured with a dry laser measuring instrument (HELOS & RODOS system (product name, available from Sympatec GmbH)) as a value corresponding to the cumulative weight percentage of 50.

The paraffin wax is not limited and may be a known one usable in lubricants for use on snow or ice.

The first lubricant preferably further contains a fluororesin. Such a lubricant can further enhance the slidability on snow or ice. Examples of the fluororesin include polytetrafluoroethylene (PTFE), a tetrafluoroethylene (TFE)/perfluoro(alkylvinyl ether) (PAVE) copolymer (PFA), and polyvinylidene difluoride (PVDF). Particularly preferred are PTFE and PFA.

The amount of the fluororesin used may be 0.1 to 10% by mass relative to the paraffin wax.

The first lubricant may further contain a known additive in an amount that does not impair the above effect.

The first lubricant can be appropriately used by being applied to the target (e.g., the sliding surface of snow or ice sliding equipment). In this case, the first lubricant is preferably applied such that the amount of the carbon fluoride in the vicinity of a target on which a coating film of the lubricant is to be formed is larger than the amount of the carbon fluoride on the surface opposite the target. Such application can further enhance the slidability on snow or ice.

The application state of the lubricant as described above can be determined by, for example, scraping the lubricant with a scraper sequentially from the surface opposite the target on which the coating film of the lubricant is formed to obtain samples, measuring the amount of the carbon fluoride (proportion to the paraffin wax) in each sample, and comparing the measured amounts. When the amount of the carbon fluoride in the sample from the vicinity of the target is larger than the amount of the carbon fluoride in the sample from the surface, the lubricant is determined to be applied in the above manner.

The coated surface obtained by coating with the first lubricant has a low friction resistance and thus has favorable slidability. The coated surface preferably has a coefficient of static friction of 0.16 to 0.20, more preferably 0.17 to 0.19. The coated surface also preferably has a coefficient of kinetic friction of 0.05 to 0.10, more preferably 0.06 to 0.08.

The disclosure also relates to a method of coating a target including irregularities on a surface with a lubricant for use on snow or ice, the method including:

(1) applying carbon fluoride to the surface including the irregularities of the target;

(2) applying a paraffin wax to the surface to which the carbon fluoride has been applied;

(3) smoothing a surface of a resulting coating film; and (4) exposing the irregularities by treatment on the smoothed surface of the coating film, wherein a proportion of the carbon fluoride is 0.1 to 2.0% by mass relative to the paraffin wax.

The above features can enhance the slidability on snow or ice. The features can also enhance the antifouling property of the sliding surface to reduce the chances for dust on snow or ice to adhere to sliding equipment, leading to slidability that hardly decreases during sliding. The features also make the slidability less susceptible to the snow quality, achieving stable slidability.

The coating method of the disclosure can be appropriate as a method of coating a target with the first lubricant.

The target (e.g., the sliding surface of snow or ice sliding equipment) in the coating method of the disclosure has irregularities on a surface. The irregularities are preferably fine groove-shaped structures. For example, the irregularities may be groove-shaped structures having a depth of 15 μm to 45 μm and a width of 10 μm to 50 μm. Also, the irregularities may be fine, groove-shaped repeating structures. Examples of the irregularities include grooves (structures) formed on the sliding surface of snow or ice sliding equipment.

Examples of the carbon fluoride and the paraffin wax used in the coating method of the disclosure include the same carbon fluoride and paraffin wax as those usable in the first lubricant.

Step (1) can be performed by, for example, applying carbon fluoride to the target and flattening the carbon fluoride with a sponge or the like tool as needed.

Step (1) is preferably preceded by removal of dirt and impurities from the surface of the target. After step (1), the applied carbon fluoride may be heated with a heat source such as an iron or may be rubbed with a piece of cork while being pressed onto the target, for example. These processes may cause the temperature of the carbon fluoride to be higher than the ordinary temperature as a result of heating or release of heat. In such a case, the carbon fluoride may be cooled to the ordinary temperature.

Step (2) can be performed by, for example, applying a paraffin wax to the surface on which the carbon fluoride has been applied and flattening the paraffin wax with a sponge or the like tool as needed. The paraffin wax may be softened or melted by heat before use.

After step (2), the applied paraffin wax may be heated with a heat source such as an iron or may be rubbed with a piece of cork while being pressed onto the target, for example. These processes may cause the temperature of the paraffin wax to be higher than the ordinary temperature as a result of heating or release of heat. In such a case, the paraffin wax may be cooled to the ordinary temperature.

Step (3) can be performed by, for example, shaving the surface of the coating film obtained in step (2) with a scraper. The shaving using a scraper may be conducted once or divided into plural times.

In step (3), 3 to 50% by mass of the entire coating film obtained in step (2) is preferably removed.

After step (3), another lubricant may be further applied or added to the coated surface.

Step (4) can be performed by, for example, scraping the lubricant covering the irregularities on the surface of the coating film obtained in step (3) with a brush, and removing an excess amount of the lubricant with a removal sheet. The process in step (4) should expose at least some of the irregularities. Removing too large or too small an amount of the lubricant may reduce the slidability.

The carbon fluoride is used in the coating method of the disclosure in a proportion of 0.1 to 2.0% by mass relative to the paraffin wax. The proportion of the carbon fluoride is preferably 0.3% by mass or higher and 0.9% by mass or lower relative to the paraffin wax.

The coating method of the disclosure can form, for example, a coating film of a lubricant containing 0.1 to 2.0% by mass of the carbon fluoride relative to the paraffin wax on the target after step (4). The method also can cause the amount of the carbon fluoride in the vicinity of the target on which the coating film of the lubricant is formed to be larger than the amount of the carbon fluoride on the surface opposite the target.

The coated surface obtained by the coating method of the disclosure has a low friction resistance and thus has favorable slidability. The coated surface preferably has a coefficient of static friction of 0.16 to 0.20, more preferably 0.17 to 0.19. The coated surface also preferably has a coefficient of kinetic friction of 0.05 to 0.10, more preferably 0.06 to 0.08.

The disclosure also relates to a lubricant for use on snow or ice, which consists of carbon fluoride (hereinafter, such a lubricant is also referred to as the second lubricant). The lubricant for use on snow or ice containing carbon fluoride alone has been unknown.

The second lubricant containing carbon fluoride alone can enhance the slidability on snow or ice. The second lubricant also has a high antifouling property which reduces the chances for dust on snow or ice to adhere to sliding equipment, leading to slidability that hardly decreases during sliding. The second lubricant also makes the slidability less susceptible to the snow quality, achieving stable slidability.

Examples of the carbon fluoride used in the second lubricant include the same carbon fluorides as those in the first lubricant.

The method of coating the target with the second lubricant may include, for example, applying the second lubricant to the target and flattening the second lubricant with a sponge or the like tool as needed.

The coating is preferably preceded by removal of dirt and impurities from the surface of the target in advance. After the coating, the applied second lubricant may be heated with a heat source such as an iron or may be rubbed with a piece of cork while being pressed onto the target, for example. The latter process is preferred. These processes may cause the temperature of the second lubricant to be higher than the ordinary temperature as a result of heating or release of heat. In such a case, the second lubricant may be cooled to the ordinary temperature.

Also preferably, the surface of the coating film of the second lubricant may be treated with a scraper, a brush, or a removal sheet to remove an excess amount of the lubricant.

The coated surface obtained by coating with the second lubricant has a low friction resistance and thus has favorable slidability. The coated surface preferably has a coefficient of static friction of 0.16 to 0.22, more preferably 0.18 to 0.20. The coated surface also preferably has a coefficient of kinetic friction of 0.07 to 0.12, more preferably 0.08 to 0.10.

The first and second lubricants and the lubricant in the coating method of the disclosure are for use on snow or ice, and are used to coat the sliding surface of sliding equipment used to slide on snow or ice, for example. The expression "on snow or ice" as used in the disclosure means on snow, on ice, or on both snow or ice. The snow or ice may be natural or artificial.

The first and second lubricants and the lubricant in the coating method of the disclosure can be used in various activities of sliding on snow or ice. The activities include those using riding equipment, including skiing, skating, snowboarding, and sledding. Coating the sliding surface of sliding equipment (e.g., skis, blades of skates, snowboards) used in these activities with the first or second lubricant can enhance the slidability on snow or ice. In particular, the first and second lubricants and the lubricant in the coating method of the disclosure are preferably used for skiing, skating, or snowboarding, more preferably for skiing or skating.

EXAMPLES

The disclosure is described in more detail based on examples below. The disclosure is not limited to these examples.

The following components were used in experimental examples.

Carbon fluoride 1: available from Daikin Industries, Ltd., F/C=0.73

Carbon fluoride 2: available from Daikin Industries, Ltd., F/C=0.86

Carbon fluoride 3: available from Daikin Industries, Ltd., F/C=0.91

Carbon fluoride 4: available from Daikin Industries, Ltd., F/C=0.98

Carbon fluoride 5: available form Daikin Industries, Ltd., F/C=0.99

Carbon fluoride 6: available from Daikin Industries, Ltd., F/C=1.00

Carbon fluoride 7: available from Daikin Industries, Ltd., F/C=1.05

BIG 555: available from Hayashi Wax, paraffin wax
FC7: available from SWIX Sport Japan K.K., fluororesin-containing paraffin wax
FC80L: available from SWIX Sport Japan K.K., fluororesin-containing paraffin wax

EXPERIMENTAL EXAMPLES

<Production of Samples>
The sliding surfaces of skis were treated as follows to produce samples.

Experimental Examples 1 and 13: BIG 555

BIG 555 "hot waxing"→"wax removal"

Experimental Example 2: Carbon Fluoride 1+BIG 555

Carbon fluoride 1 "raw waxing"→BIG 555 "hot waxing-"→"wax removal"

Experimental Example 3: Carbon Fluoride 2+BIG 555

Carbon fluoride 2 "raw waxing"→BIG 555 "hot waxing-"→"wax removal"

Experimental Example 4: Carbon Fluoride 3+BIG 555

Carbon fluoride 3 "raw waxing"→BIG 555 "hot waxing-"→"wax removal"

Experimental Example 5: Carbon Fluoride 4+BIG 555

Carbon fluoride 4 "raw waxing"→BIG 555 "hot waxing-"→"wax removal"

Experimental Example 6: Carbon Fluoride 5+BIG 555

Carbon fluoride 5 "raw waxing"→BIG 555 "hot waxing-"→"wax removal"

Experimental Examples 7 and 10: Carbon Fluoride 6+BIG 555

Carbon fluoride 6 "raw waxing"→BIG 555 "hot waxing-"→"wax removal"

Experimental Example 8: Carbon Fluoride 7+BIG 555

Carbon fluoride 7 "raw waxing"→BIG 555 "hot waxing-"→"wax removal"

Experimental Example 9: Carbon Fluoride 6

Carbon fluoride 6 "raw waxing"→"wax removal"

Experimental Example 11, Field Test Example 1: Carbon Fluoride 6+FC7

Carbon fluoride 6 "raw waxing"→FC7 "hot waxing-"→"wax removal"

Experimental Example 12, Field Test Example 2: Carbon Fluoride 6+FC7+FC80L

Carbon fluoride 6 "raw waxing"→FC7 "hot waxing-"→"wax removal"→FC80L "raw waxing"→"cork spreading"→"wax removal"

Field Test Example 3: FC7

FC7 "hot waxing"→"wax removal"

Field Test Example 4: Carbon Fluoride 7+FC7

Carbon fluoride 7 "raw waxing"→FC7 "hot waxing-"→"wax removal"

The processes in the production of samples are described in detail below.

"Raw Waxing"
The lubricant was directly applied to a ski base (grooved surface of sliding equipment), and the lubricant was flattened with a sponge, so that the lubricant adhered to the entire surface of the ski base.

"Hot Waxing"
The lubricant adhering to the ski base was burnt at 120° C. with an iron.

"Cork Spreading"
After "raw waxing", the lubricant was rubbed with a piece of cork while being pressed onto the ski base, so that the lubricant adhered to the entire surface of the ski base while releasing heat.

"Wax Removal"
After "hot waxing" or "cork spreading", the lubricant was left to stand for cooling and fixation for two to three hours. Then, an excess amount of the lubricant adhering to the ski base was removed.

For the removal, a scraper, a brush, and a removal sheet were used. Specifically, the excess amount of the lubricant adhering to the ski base was scraped with a scraper. The excess amount of the lubricant in the structures (grooves) formed on the ski base was removed with a brush or a rough-textured removal sheet. Finally, fine shavings were removed with a fine-textured removal sheet.

The coefficients of friction of the samples produced above were measured and evaluated by the following method. Tables 1 and 2 show the results.

(Coefficients of Friction)
The coefficient of static friction and the coefficient of kinetic friction were measured with a surface texture measuring instrument (available from Shinto Scientific Co., Ltd., Type: 38) using SUS balls as friction elements in accordance with ASTM D1894.

TABLE 1

| | | | Coefficient of friction | |
|---|---|---|---|---|
| Experimental Example No. | Paraffin wax | Carbon fluoride F/C | Static friction | Kinetic friction |
| 1 | BIG 555 | N/A | 0.33 | 0.18 |
| 2 | | 0.73 | 0.19 | 0.09 |
| 3 | | 0.86 | 0.19 | 0.08 |
| 4 | | 0.91 | 0.21 | 0.09 |
| 5 | | 0.98 | 0.19 | 0.07 |
| 6 | | 0.99 | 0.21 | 0.09 |
| 7 | | 1.00 | 0.18 | 0.06 |
| 8 | | 1.05 | 0.18 | 0.06 |

*The mixing ratio between the carbon fluoride and the paraffin wax in Experimental Examples 2 to 8 in Table 1 is 0.6/99.4 (% by mass).

TABLE 2

| Experimental Example No. | Paraffin wax | Mixing ratio (mass %) | | Coefficient of friction | |
|---|---|---|---|---|---|
| | | Carbon fluoride F/C =1.00 | Paraffin wax | Static friction | Kinetic friction |
| 9 | N/A | 100 | 0 | 0.20 | 0.10 |
| 10 | BIG 555 | 0.6 | 99.4 | 0.18 | 0.06 |
| 11 | FC7 | 0.6 | 99.4 | 0.19 | 0.08 |
| 12 | FC7 + FC80L | 0.6 | 99.4 | 0.23 | 0.08 |
| 13 | BIG 555 | 0 | 100 | 0.33 | 0.18 |

Field Test Examples 1 to 4

Sliding was performed using the skis treated as described above under the conditions shown in Table 3. Table 4 shows the results.

TABLE 3

| Conditions | |
|---|---|
| Place of test | Hakuba |
| Date of test | 2017-02-15 |
| Time | 11:00 |
| Snow temperature ° C. | −2.3 |
| Temperature ° C. | 1 |
| Humidity % RH | 57% |
| Weather | Sunny |
| Snow quality | Shinny |

TABLE 4

| Field test example | 1 | 2 | 3 | 4 |
|---|---|---|---|---|
| First | 1754 | 1769 | 1777 | 1753 |
| Second | 1760 | 1753 | 1768 | 1759 |
| Third | 1750 | 1769 | 1760 | 1749 |
| Fourth | 1754 | 1763 | 1768 | 1752 |
| AVG. | 1754.5 | 1763.5 | 1768.3 | 1753.3 |
| TRIMEAN | 1754 | 1766 | 1768 | 1753 |

The values in Table 4 were calculated by measuring the time taken to slide a certain distance and multiplying the time with a given coefficient. A lower value shows a better time. The values in the row "TRIMEAN" are each an average of the results of the first test to the fourth test, with the upper limit value and the lower limit value excluded. The value of Field Test Example 4 was the lowest. The above difference in value is significant in races where every hundredth of a second counts.

The invention claimed is:

1. Snow or ice sliding equipment comprising:
    a sliding surface and a coating film of a lubricant for use on snow or ice,
    the coating film being formed on the sliding surface, wherein
        the lubricant contains a paraffin wax and graphite fluoride in an amount of 0.1-2.0 mass % relative to the paraffin wax fluoride is contained in an amount of 0.1-2.0 mass % relative to the paraffin wax.

2. The snow or ice sliding equipment according to claim 1, wherein a mole ratio F/C of fluorine atoms to carbon atoms in the graphite fluoride is 1.00 or higher.

3. The snow or ice sliding equipment according to claim 1, for skiing or skating.

4. The snow or ice sliding equipment according to claim 1, wherein the lubricant containing a paraffin wax and graphite fluoride further comprises a fluororesin.

* * * * *